United States Patent [19]

Piallat

[11] Patent Number: 6,163,375

[45] Date of Patent: Dec. 19, 2000

[54] DEVICES FOR TAKING MOTION PICTURES FROM AN AIRCRAFT

[75] Inventor: Patrick Piallat, Colomiers, France

[73] Assignee: Aero Vision, Blagnac, France

[21] Appl. No.: 09/246,800

[22] Filed: Feb. 9, 1999

[30] Foreign Application Priority Data

Feb. 9, 1998 [FR] France .................................. 98 01461

[51] Int. Cl.⁷ .............................. G01B 11/24; H01J 3/14
[52] U.S. Cl. .......................... 356/376; 356/256; 250/234; 250/235
[58] Field of Search .................................... 356/376, 256; 250/235, 222.2, 330, 234, 227.26, 227.28, 227.24, 580

[56] References Cited

U.S. PATENT DOCUMENTS

| | | |
|---|---|---|
| 4,747,574 | 5/1988 | Hofmann . |
| 5,115,266 | 5/1992 | Troje .......................................... 354/95 |
| 5,790,181 | 8/1998 | Chahl et al. .............................. 348/36 |

FOREIGN PATENT DOCUMENTS

| | | |
|---|---|---|
| 2121918 | 11/1972 | Germany . |
| 195 17 122 | 11/1995 | Germany . |
| 197 08 684 | 6/1997 | Germany . |
| 03250870 | 11/1991 | Japan . |

Primary Examiner—Frank G. Font
Assistant Examiner—Roy M. Punnoose
Attorney, Agent, or Firm—Young & Thompson

[57] ABSTRACT

A device for taking aerial motion pictures, includes a camera (3) disposed at the upper end of a vertical periscopic tube (2) whose lower end (1) projects below a carrying airplane. An optical device is provided, adapted to effect vertical sweeping by pivoting about a horizontal axis. The periscopic tube (2) can pivot about its vertical axis and the camera (3) can pivot coaxially relative to the periscopic tube (2). The periscopic tube (2) is carried by a first turning plate (41) mounted rotatably on a fixed plate (40) and driven in rotation by a motor (43), whilst the camera (3) is carried by a second turning plate (51) mounted for rotation on a second fixed plate (50) and driven in rotation by a second motor (53).

20 Claims, 3 Drawing Sheets

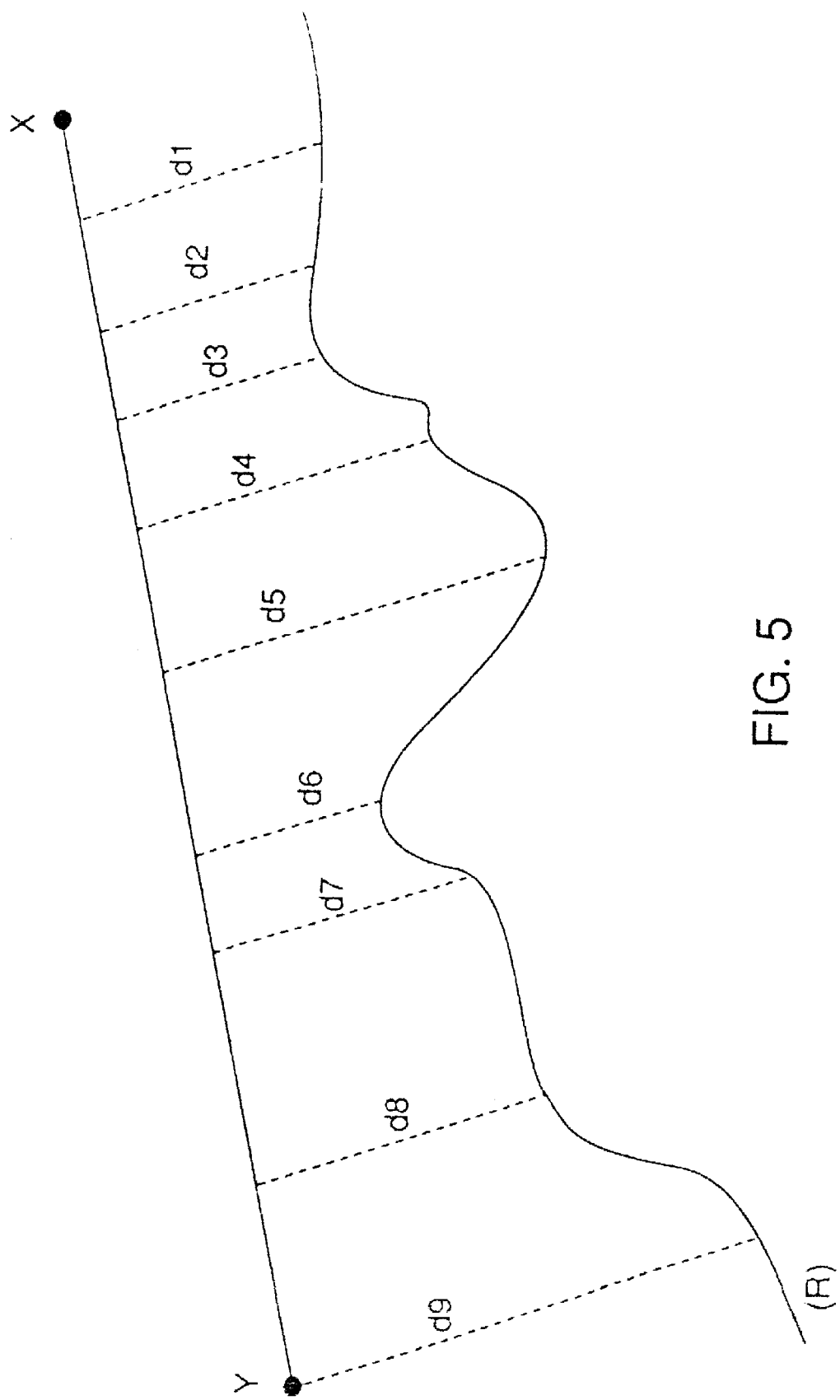

DEVICES FOR TAKING MOTION PICTURES FROM AN AIRCRAFT

BACKGROUND OF THE INVENTION

This application corresponds to French application 98 01461 of Feb. 9, 1998, the disclosure of which is incorporated herein by reference.

The present invention has for its object improvements in devices for taking motion pictures from an aircraft such as an airplane or a helicopter.

It is known to film one airplane in flight from another airplane, for example to present a new airplane or for publicity of aeronautical companies.

To do this, there is used a camera mounted at the upper end of a periscope disposed in an airplane, and whose lower end projects outside below the cabin. On this end is disposed a total reflection prism which returns the image through the periscope to the camera. The prism is movable about a horizontal axis so as to be able to undergo vertical swinging of 100 above the horizon and 30° below. Moreover, this periscope is carried by a turntable which permits pivoting about its vertical axis to sweep the horizon around 360°.

This device has been improved a first time by mounting the camera on the periscope such that it can turn relative to this latter. Thus, when the periscope is rotated to drive the camera, there is a panoramic sweeping and, when the camera is turned relative to the periscope, a modification of the inclination of the image which permits correcting as needed the horizontality of the image.

The apparatus now in use is insufficient to turn aircraft films taken at high speed, even when this view-taking material is itself installed in a jet plane of the business plane type (Learjet, Falcon, Corvette or the like).

SUMMARY OF THE INVENTION

The present invention relates to an apparatus for taking aerial motion pictures of the known rotatable periscope type, characterized by the fact that it comprises improvements of the optical periscope system; of the means for rotating the periscope and/or the camera, and of the control means of the different movements.

BRIEF DESCRIPTION OF THE DRAWINGS

So as to facilitate understanding of the invention, there are shown on the accompanying drawings:

FIG. 5 a schematic view showing an itinerary filmed from a fixed XY trajectory.

DESCRIPTION OF THE PREFERRED EMBODIMENTS

Figure 1:
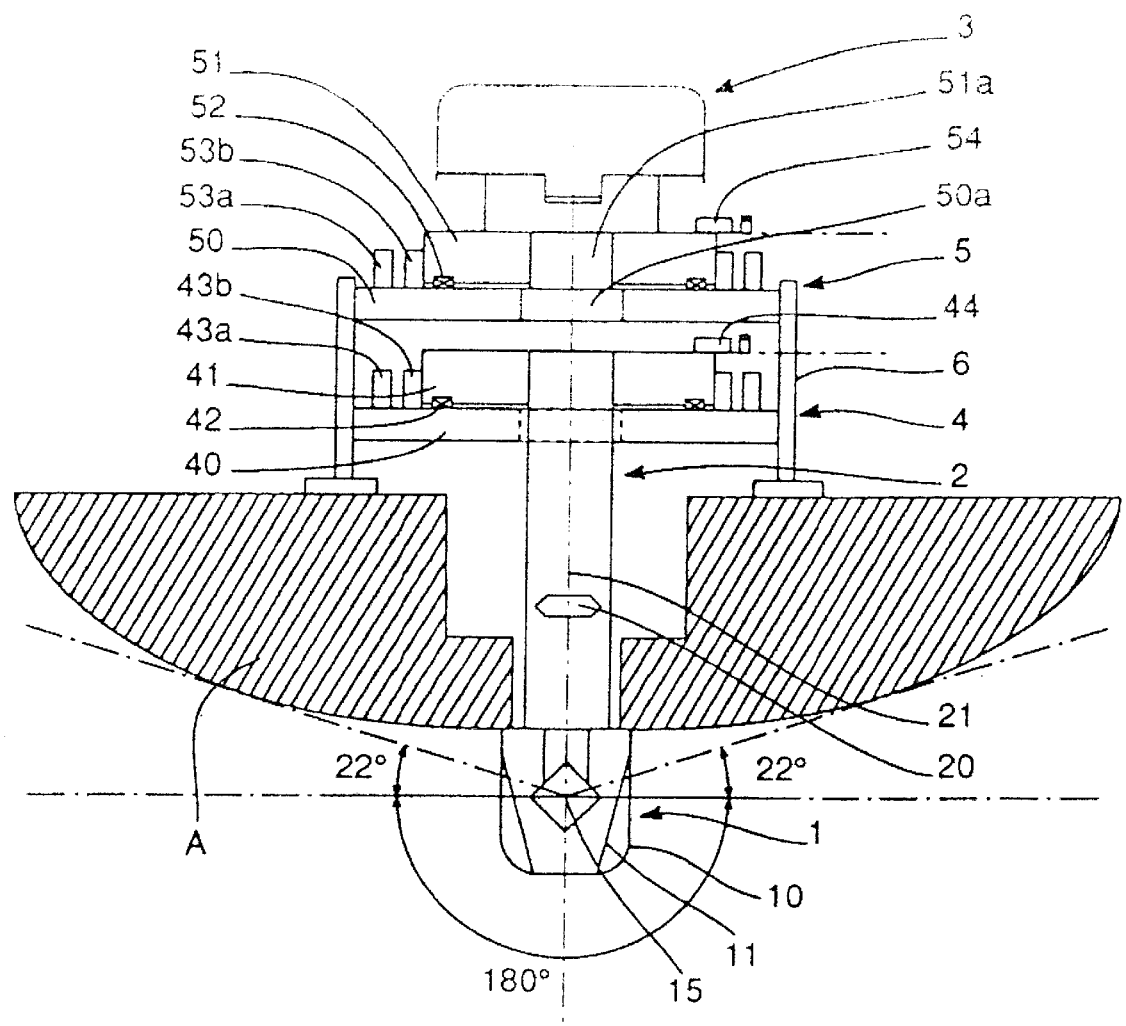
FIG. 1 a schematic side elevational view, partially broken away, of a device according to the invention mounted on an accompanying airplane.

Referring to these figures, it will be seen that the apparatus for taking aerial motion pictures from an aircraft, for example from an airplane, is constituted:

by a prism 1,
by a periscopic tube 2,
and by a camera 3.

The periscopic tube 2, at the end of which is located the prism 1, passes through the floor of the cabin as well as the wall of the cabin of the airplane A. The periscopic tube 2 is mounted rotatably relative to the airplane A and projects outside the cabin of the airplane A in a dome 10 provided with windows such as 11.

In the known device, the end of the periscope comprises a mirror whose inclination can be changed. This mirror is a roof prism, which is to say a prism which rectifies the image. This prism is carried by a pivoting lever which is subjected to the traction of a cable, under the force of a return spring. As a result, the center of gravity of the assembly is not located on the axis of rotation of the prism, which has the result that when the carrying airplane is subjected, during maneuvers, to acceleration (and hence an increase of the "g" number) the mirror pivots by stretching its return spring, which makes it practically impossible to follow the target.

According to the present invention, there is used a special prism 1 (made by the KINOPTIC Company and not described because it does not form a part of the present invention), which, in short, is a double mirror 13 with a prism (14, 15) on each side and which is carried rotatably by a shaft 16 passing through its axis of symmetry so as to be perfectly balanced and hence insensitive to vibrations of the gravity (the variations of the "g" number).

By turning about its axis 16, this prism can carry out a complete vertical sweeping about 360°. In practice, because of the obstacle constituted by the cabin of the airplane A, this sweeping is limited to 22° above the horizon on each side of the vertical; as a result the sweeping is 224° (22+180+22); which is to say considerably greater than that of the known roof prism device which permits a partial sweeping only between 10° above the horizon and 30° below.

Moreover, the roof prism mirror of the prior art device gave rise to an increase of the image which on the one hand deformed the image and above all did not permit using certain cameras.

The prism employed in the device according to the invention is an a focal system of enlargement 1, having a field of 33° which permits using any camera 3.

The use of a prism such as the prism 1 gives rise to a considerable improvement as to the balancing the masses and sweeping, but has the drawback of inverting the image, which a roof prism does not. It is thus necessary to rectify the image, which can be done only in the periscopic tube 2, which requires the use of a prism 20 called a "Pechan prism" which carries out rectification of the image along the optical axis 21.

Figure 2:
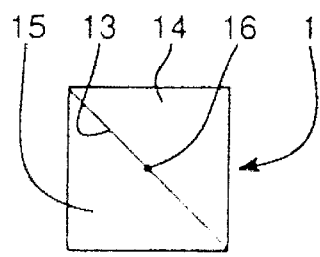
FIG. 2 a schematic front view of the prism of the telescopic tube.
Figure 3:
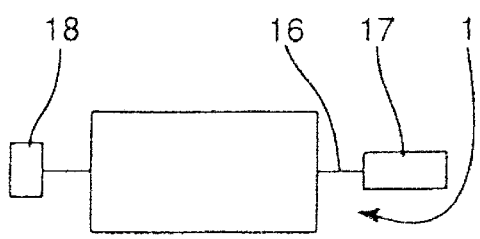
FIG. 3 a schematic side view of the prism of FIG. 2.

As is shown schematically in FIGS. 2 and 3, the shaft 16 which carries the prism 1 also carries the drive motor 17 and the position detector 18. The drive motor 17 is a linear motor such that there is no mechanical movement transmission member between the motor 17 and the shaft 16, which eliminates any vibration.

Another improvement relates to the rotatable drive means of the periscopic tube 2 about its axis of rotation coaxially with the camera 3 relative to the periscopic tube.

In the known apparatus, when the periscopic tube 2 turns, because it carries the camera 3, the latter turns at the same time and, to obtain rotation of the camera 3 relative to the tube 2, there is disposed between the camera and the periscope a motor.

The rotation of the periscope is obtained by a transmission comprising an endless screw (driven by a motor) engaging with a hollow wheel. The rotation of the camera relative to the periscope is obtained by the same means. As a result, on the one hand, the movements of rotation are slow, on the other hand vibrations connected to flight are transmitted to the periscope and to the camera.

According to the invention, the two elements, namely, the periscopic tube 2 and the camera 3, are carried independently of each other, each by a turning assembly 4 and 5. The two assemblies 4 and 5 are each carried by a chassis 6 resting on the floor of the airplane A.

Each is constituted by a circular plate 40, 50 fixed to the chassis 6, bearing a turning plate 41, 51 by means of ball bearings 42, 52. Each turning plate is rotated by a linear motor 43, 53 comprising a stator 43a, 53a and a rotor 43b, 53b, the stator being carried by the fixed plate 40, 50 and the rotor by the turning plate 41, 51. With each turning plate is associated a position detector 44, 54.

The cylindrical tube 22 which carries at its end a prism 1, passes through the fixed plate 40 and the turning plate 41 and is fixed to it. The fixed plate 50 and the turning plate 51 each comprise a central hole 50a and 51a which permits the optical beam passing through the periscopic tube 2 to arrive at the camera 3.

In the example shown, the fixed plates 40, 50, the turning plates 41, 51 and the motors 43, 53 are identical, which permits standardization of the parts.

One of the particularities of the invention is that this embodiment of the means carrying the periscopic tube 2 and the camera 3, permits being able to carry the turning elements 41, 51 by bearings 42, 52 of large dimensions. By large dimensions is meant that the bearings 42, 52 have a diameter of the order of 400 millimeters, whilst in the known device the periscope is carried directly by a bearing of 150 millimeters. In the known device it is the same bearing (of 150 mm) which carries both the periscopic tube 2 and the camera 3 because the latter is carried by the periscope, such that vibrations transmitted to the periscope are also transmitted to the camera. By arranging each element independently of each other on two turning tables 4 and 5 independent of each other and of large dimensions, the undesirable effects of vibrations are practically eliminated.

The motors 43–53 are linear motors of high couple permitting a maximum speed of rotation of the order of 540° per second and a precision of angular movement of the order of 0.005°. The use of such motors also leads to the elimination of the undesirable effects of vibrations.

However, this arrangement, although quite advantageous as to the elimination of vibrations, as well as rapidity and precision of movements, gives rise to a problem connected to the synchronism of the movements of the periscopic tube 2 and of the camera 3 when a panoramic sweeping is effected.

Thus, in the known device, because the periscopic tube 2 carries the camera 3, this latter turns with the periscope and the synchronism is perfect. In this system, the motor causing the camera to turn relative to the periscopic tube is only used to correct inclination, and hence carries out very small movements.

On the contrary, in the device according to the present invention, when sweeping by turning the periscopic tube, the camera 3 must carry out exactly the same movement of rotation, at the same speed, in an absolutely synchronous manner; lacking this, parasitic inclinations of the image will arise.

To overcome this drawback, the controls of the motors 43 and 53 are controlled by a computer such that the movements of the tables will be synchronized to about 0.005°

This is made possible by the fact that the motors 43 and 53, being linear motors, can be controlled by digital computers, which is not the case of the DC motor previously used.

The use of linear motors such as 18, 43 and 53 has numerous advantages which are of very great importance.

About the three axes: pitch, roll and yaw, the transmissions are exempt from mechanical means such as hollow wheels or endless screws, which has the effect not only of eliminating dimensional errors but also any vibration.

Moreover, the linear motor of strong couple such as motors 43–53 permits very rapid accelerations.

Furthermore, they can also be operated by a computer, which is to say by digital control which permits having a control regime based on frequency and hence precise synchronization to 10 rotations per second.

The movements of the camera 3 relative to the periscopic tube 2 have for their object to correct variations of horizontality of the image, variations which are essentially due to turbulence.

The compensation of turbulence requires displacements which are of the order of 1 to 2 degrees, but at a frequency of the order of 15 to 20 Hertz: this is quite impossible with the camera/periscopic tube connection with a conventional motor driving an endless screw engaging with a hollow wheel.

The arrangement according to the present invention permits among other things selecting gyrostabilization of the image, which is impossible with the known means.

It is to be noted that one could, by following the prior art, carry the camera 3 on a plate 41 and provide a linear motor between this plate 41 and the camera 3; but this would not work. Thus, as a linear motor is free from any mechanical means, any controlled movement of the camera 3 relative to the tube 2 (or vice versa) would give rise by reaction or an antagonistic couple to a movement in opposite directions from each other. It is therefore imperative to have two rotation means that are independent from each other, separately controlled.

The use of a computer to control the movements of the turning tables permits computerizing all the system.

The control system comprises:
a computer controlling all the system
a computer keyboard
two screens, one permitting visualizing the centering, the other giving digital data for positioning of the target filmed relative to the carrying aircraft as well as the different parameters of the views.
two mini-control sticks, of which one acts on the vertical sweeping movement of the prism 1 and on the rotation movement of the periscopic tube 2; the other on the rotation of the camera 3 relative to the periscopic tube 2 (correction of horizontality) and on the zooming of the camera 3.

Figure 4:
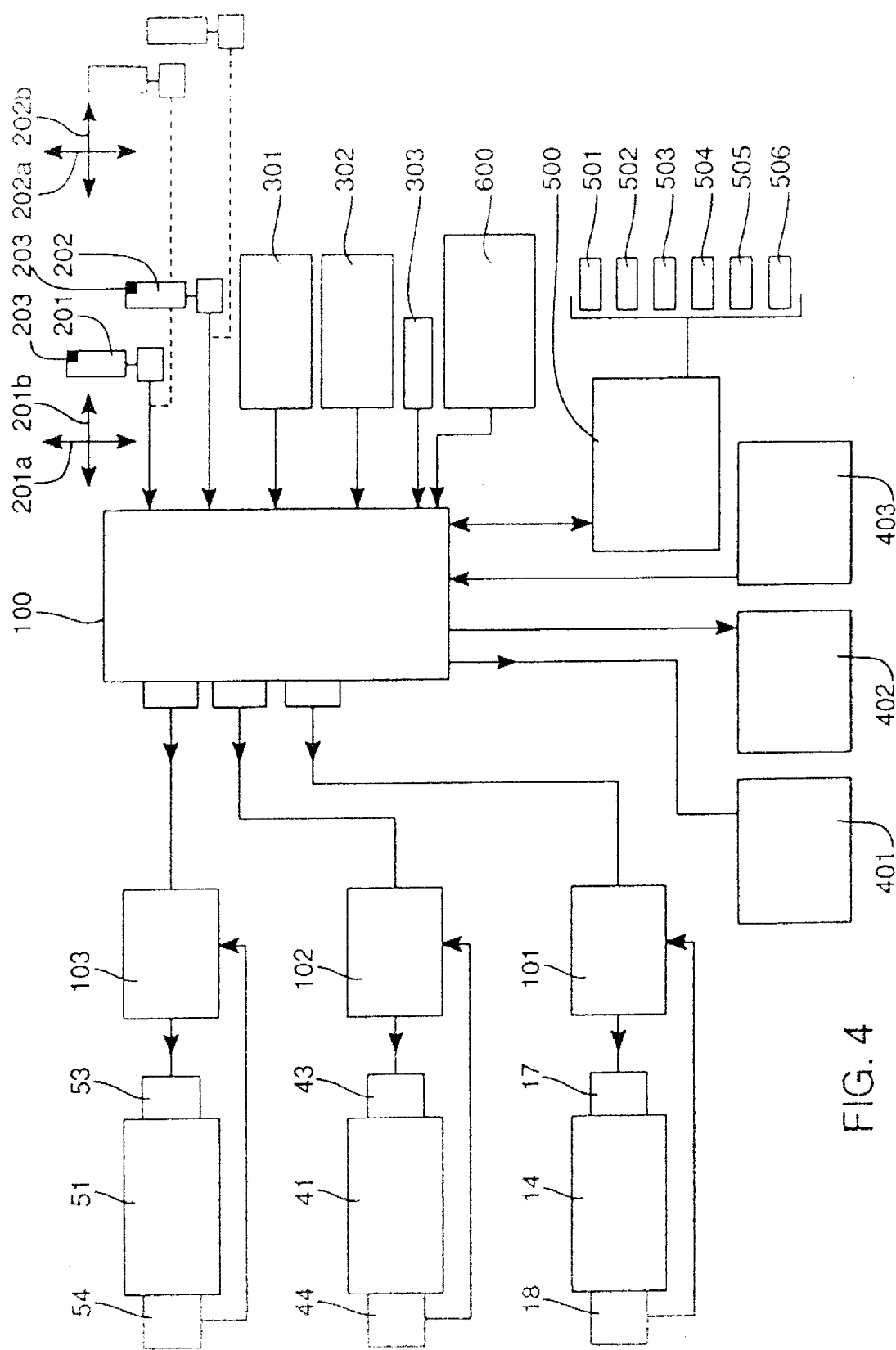
FIG. 4 a diagram showing the connections of the various elements.

FIG. 4 is a diagram of the computer connections of the system.

Referring to this figure, it will be seen that the system comprises a central computer 100, which can be a P.C., which is connected to a screen 401, a printer 402 and a keyboard 403.

Each of the linear motors 17, 43 and 53 is connected to the computer 100 by means of a pilot 101, 102, 103 respectively, to which are connected the positions detectors 18, 44 and 54.

The computer 100 is also connected to two minicontrol sticks 201 and 202; the displacements of the minicontrol sticks 201 and 202 are shown by crossed arrows. The double arrow 201a corresponds to movements of the tube 2 for panoramic sweeping; the double arrow 201b corresponds to the movements of the prism 14 for sweeping along the pitch axis.

The double arrow 202a corresponds to distance movements, which is to say zooming; the double arrow 202b corresponds to displacements along the roll axis.

Thus by means of the two mini-control sticks 201 and 202 there is controlled, by means of the computer 100, the pilots 101, 102 and 103 and hence the motors 17, 43 and 53 and the displacements along the pitch axis, the yaw axis, the roll axis as well as zooming.

It will also be understood that there can be one or several pairs of mini-control sticks to carry out double control or formation.

Again in FIG. 4, it will be seen that the computer 100 can be connected to gyroscopic stabilizers 301, 302 and 303 so as to have gyroscopic stability about the three axes.

The computer can also be connected to a known system called CPMS (Camera Pointing Management System) which, by means of a satellite positioning apparatus can automatically direct the camera according to a pre-established itinerary.

Thus, for example, if it is desired automatically to film an itinerary along route R (FIG. 5) from an airplane which moves from a point X to a point Y at constant altitude and on a constant course, there can be calculated in advance the distances $d_1$, $d_2$, $d_3$, ... etc. and the variations of the angle of the camera, and then introduce it into the apparatus 600 which will automatically control the movements of the prism 1 and of zooming.

There could also be connected to the computer 100 a data recording apparatus 500 which would record automatically all the associated data:

of the pitch angle: 501
of the roll angle: 502
of the course of the aircraft: 503
of the altitude: 504
of the geographic position: 505
of the time and date: 506 among others.

This computerization of the system permits having three modes of operation:

a a manual mode: the operator, by means of two mini-control sticks, controls the four movements, b an automatic mode over a given pre-recorded trajectory. The airplane (on automatic pilot) and the system following the instructions given by the computer, c a semiautomatic mode: by gyroscopic stabilization, the random movements of the carrying airplane are automatically compensated to have a stable image.

Moreover, this permits recording and memorizing all the positions of the camera, of the periscope, those of the carrying airplane, the geographic coordinates of movement of the airplane and the time. These recordations permit carrying out at low cost the splicing of synthesized images.

There could also be provided on the mini-control sticks 201 and/or 202, buttons 203 which permit selecting different laws of variation of the speed of movement of the motors 17, 43 or 53. Thus, when the carrying aircraft and the filmed aircraft fly in formation, the relative movements are small and the corrections to be made are less great but precise; whilst when airplane A flies behind a filmed airplane which maneuvers sharply (in the case of an action film for example), the corrections to be made are great and abrupt.

What is claimed is:

1. A device for taking aerial motion pictures, comprising:
    a camera (3) disposed at the upper end of a periscopic vertical tube (2) whose lower end (1) projects below an aircraft; and
    an optical device that is pivotable about a horizontal axis to effect vertical sweeping,
    the periscopic tube (2) being pivotable about its vertical axis and the camera (3) being pivotable coaxially relative to said periscopic tube (2),
    the periscopic tube (2) being carried by a first turning plate (41) mounted rotatably on a fixed plate (40) and driven in rotation by a motor (43), and
    the camera (3) being carried by a second turning plate (51) mounted for rotation on a fixed plate (50) and driven in rotation by a motor (53).

2. A device according to claim 1, in which the motors (43, 53) are linear motors of strong couple permitting a speed of rotation of about 540° per minute and an angular precision of about 0.0050°.

3. A device according to claim 2, in which each turning plate has a position detector (44, 54).

4. A device according to claim 1, in which the turning plates (41, 51) rest on the fixed plates (40, 50) by means of roller bearings (42, 52) of large diameter of the order of 400 millimeters.

5. A device according to claim 1, in which the means carrying the periscopic tube (2) and the camera (3) are identical and interchangeable.

6. A device according to claim 1, in which the rotation of the plates (41, 51) is controlled by a computer (100) so as to be able to obtain perfect synchronization of the rotations of said plates when the device carries out panoramic sweeping.

7. A device according to claim 1, in which the periscopic tube (2) comprises at its lower end a prism (1) which can pivot about a horizontal axis passing through its center of gravity, the prism (1), in pivoting, carrying out a sweeping from 22° above the horizon downwardly and then upwardly to 22° above the horizon on the opposite side, for a total of 224°.

8. A device according to claim 7, in which the prism (1) is a double mirror (13) with a prism (14, 15) on each side, carried for rotation by a shaft (16) passing through the axis of symmetry of the prism so as to be perfectly balanced and hence insensitive to variations of gravity.

9. A device according to claim 8, in which the rotation of the shaft (16) of the prism (1) is controlled by a linear motor (17) and is provided with a position detector (18).

10. A device according to claim 8, in which the periscopic tube (2) comprises, between the prism (1) for taking views and the camera (3) an optical device (20) for writing images.

11. A device according to claim 10, in which the optical device for writing images is a PECHAN prism.

12. A device according to claim 1, in which the motors of the prism (1) and the turning plates (41, 51) are linear motors and are digitally controlled by means of a pilot (101, 102, 103).

13. A device according to claim 12, in which the pilots (101, 102, 103) of the motors are connected to a computer (100).

14. A device according to claim 13, in which the computer (100) is connected to at least one pair of minicontrol sticks (201, 202), one (200) controlling displacements on the pitch and yaw axes, the other (202) displacement on the roll axis as well as the zooming.

15. A device according to claim 14, which comprises other pairs of mini-control sticks to provide double control or formation.

16. A device according to claim 13, in which the computer (100) is connected to gyroscopic stabilizers (301, 302, 303).

17. A device according to claim 13, in which the computer (100) is connected to a data recording device (500).

18. A device according to claim 13, in which the computer (100) is connected to a device (600) for automatically pointing the camera.

19. A device according to claim 13, in which the computer (100) is connected to a screen (401), a printer (402) and a keyboard (403).

20. A device according to claim 1, also comprising means to record and memorize all positions of the camera, of the periscope, the carrying airplane, as well as the geographic coordinates of movement of the carrying airplane and the time.

* * * * *